US010955064B2

(12) United States Patent
Trinchieri

(10) Patent No.: US 10,955,064 B2
(45) Date of Patent: Mar. 23, 2021

(54) SOLENOID VALVE ASSEMBLY AND METHOD OF ASSEMBLING THE SAME

(71) Applicant: Dana Motion Systems Italia S.R.L., Reggio Emilia (IT)

(72) Inventor: Piergiorgio Trinchieri, Reggio Emilia (IT)

(73) Assignee: Dana Motion Systems Italia S.r.l., Reggio Emilia (IT)

( * ) Notice: Subject to any disclaimer, the term of this patent is extended or adjusted under 35 U.S.C. 154(b) by 0 days.

(21) Appl. No.: 16/530,630

(22) Filed: Aug. 2, 2019

(65) Prior Publication Data

US 2020/0041028 A1 Feb. 6, 2020

(30) Foreign Application Priority Data

Aug. 2, 2018 (EP) .................................... 18425062

(51) Int. Cl.
| | | |
|---|---|---|
| *F16K 31/06* | (2006.01) | |
| *F16K 31/40* | (2006.01) | |
| *F16K 1/42* | (2006.01) | |
| *F16K 11/07* | (2006.01) | |

(52) U.S. Cl.
CPC .............. *F16K 31/408* (2013.01); *F16K 1/42* (2013.01); *F16K 11/0716* (2013.01); *F16K 31/0613* (2013.01); *F16K 31/0651* (2013.01); *F16K 31/0675* (2013.01)

(58) Field of Classification Search
CPC ...... F16K 31/408; F16K 1/42; F16K 31/0651; F16K 31/0675; F16K 31/0613; F16K 3/267; F16K 11/0716; F16K 31/047; F16K 31/10

USPC ......... 251/77–83, 129.01–129.22, 12, 48–55
See application file for complete search history.

(56) References Cited

U.S. PATENT DOCUMENTS

| | | | | |
|---|---|---|---|---|
| 2,296,132 A | * | 9/1942 | Wiseley | ................... B60T 13/66 |
| | | | | 251/129.21 |
| 2,457,739 A | * | 12/1948 | Sherrill | .................... F16N 39/08 |
| | | | | 123/179.12 |
| 2,650,617 A | * | 9/1953 | Wasser | .................. H01F 7/1607 |
| | | | | 251/129.19 |

(Continued)

FOREIGN PATENT DOCUMENTS

| | | |
|---|---|---|
| GB | 2382120 | 5/2003 |
| WO | 0250462 | 6/2002 |

OTHER PUBLICATIONS

European Patent Office, Extended European Search Report with Written Opinion issued in Application EP18425062.9, dated Jan. 31, 2019, 8 pages, Munich Germany.

*Primary Examiner* — John Bastianelli
(74) *Attorney, Agent, or Firm* — Marshall & Melhorn, LLC

(57) ABSTRACT

A solenoid valve may have a fixed member having a tube portion. The valve may also have a mobile plunger positioned in the tube portion, the mobile plunger being axially movable between a first and a second position. The valve may also have a rod coupled to the mobile plunger and having a spool for control of fluid flow, the rod being axially movable in the tube portion. The valve may also have an electromagnetic coil positioned externally to the fixed member, where the rod has a coupling end and the mobile plunger has a coupling element where the coupling end hookingly couples to the coupling element.

6 Claims, 5 Drawing Sheets

(56) References Cited

U.S. PATENT DOCUMENTS

| | | | | |
|---|---|---|---|---|
| 2,980,139 | A | * | 4/1961 | Lynn .................... F16K 31/0693 |
| | | | | 137/625.5 |
| 3,871,615 | A | | 3/1975 | Donner |
| 4,008,876 | A | * | 2/1977 | Bastle ................. F16K 31/0655 |
| | | | | 251/129.19 |
| 4,165,762 | A | * | 8/1979 | Acar .................... F16K 31/0631 |
| | | | | 137/625.5 |
| 4,303,088 | A | * | 12/1981 | Green ........................ B60S 1/48 |
| | | | | 137/102 |
| 4,540,154 | A | | 9/1985 | Kolchinsky |
| 4,544,128 | A | * | 10/1985 | Kolchinsky ........... F16K 31/408 |
| | | | | 251/129.03 |
| 4,757,840 | A | * | 7/1988 | Chmelar ................. F16K 11/07 |
| | | | | 137/269 |
| 5,538,026 | A | * | 7/1996 | Kazi ..................... F16K 31/408 |
| | | | | 137/1 |
| 2002/0195151 | A1 | * | 12/2002 | Erickson ............ G05D 16/2022 |
| | | | | 137/625.65 |
| 2004/0159812 | A1 | * | 8/2004 | Kaneda ............... F16K 31/0613 |
| | | | | 251/129.15 |
| 2007/0235669 | A1 | * | 10/2007 | Suzuki ................... F02M 61/20 |
| | | | | 251/50 |
| 2008/0035225 | A1 | | 2/2008 | Tackes |

\* cited by examiner

SOLENOID VALVE ASSEMBLY AND METHOD OF ASSEMBLING THE SAME

This disclosure relates generally to the field of electromagnetically controlled valves, and particularly to the field of solenoid valves.

BACKGROUND

Valves are used in a variety of technical applications for controlling the flow of a fluid. Electromagnetically controlled valves have an electromagnet and by means of the electromagnet, the valve can be opened and closed.

WO0250462 discloses an electromagnetically-actuated two-way two-position valve that is normally closed. The valve comprises an axially-mobile group which has an upper end that faces a fixed group. An obturator is intercepted and then drawn in an opening movement by the mobile group. A return spring displaces the obturator towards a closed position when the fixed group is deactivated.

In known solenoid valves, the spool may be coupled to the mobile group through a bayonet coupling. The spool may be coupled to the mobile group through a transverse movement. In a first type, the bayonet coupling comprises a through transverse path. Coupling occurs through transverse movement in a first direction. Decoupling may occur through a further movement in the first direction or a reverse transverse movement in a second direction. In a second type, the bayonet coupling comprises a partially closed transverse path. Coupling occurs through transverse movement in a first direction. Decoupling occurs through a reverse transverse movement in a second direction. The present disclosure is directed, at least in part, to improving or overcoming one or more aspects of the prior art system.

SUMMARY

In a first aspect, the present disclosure describes a solenoid valve. The solenoid valve comprises a fixed member having a tube portion; a mobile plunger positioned in the tube portion, the mobile plunger being axially movable between a first and a second position; a rod coupled to the mobile plunger and having a spool for control of fluid flow, the rod being axially movable in the tube portion; and an electromagnetic coil positioned externally to the fixed member, characterized in that the rod has a coupling end and the mobile plunger has a coupling element wherein the coupling end hookingly couples to the coupling element.

In a second aspect, the present disclosure describes a method of assembling the solenoid valve. The method may comprise the steps of providing the fixed member having the tube portion and an electromagnetic coil externally positioned on the fixed member; coupling the rod to a mobile plunger, the rod having a spool for control of fluid flow; inserting the mobile plunger in the tube portion, the mobile plunger being axially movable between a first and a second position and the rod being axially movable in the tube portion and hookingly coupling the coupling end of the rod to a coupling element of the mobile plunger.

BRIEF DESCRIPTION OF THE DRAWINGS

The foregoing and other features and advantages of the present disclosure will be more fully understood from the following description of various embodiments, when read together with the accompanying drawings, in which.

DETAILED DESCRIPTION

Figure 1:
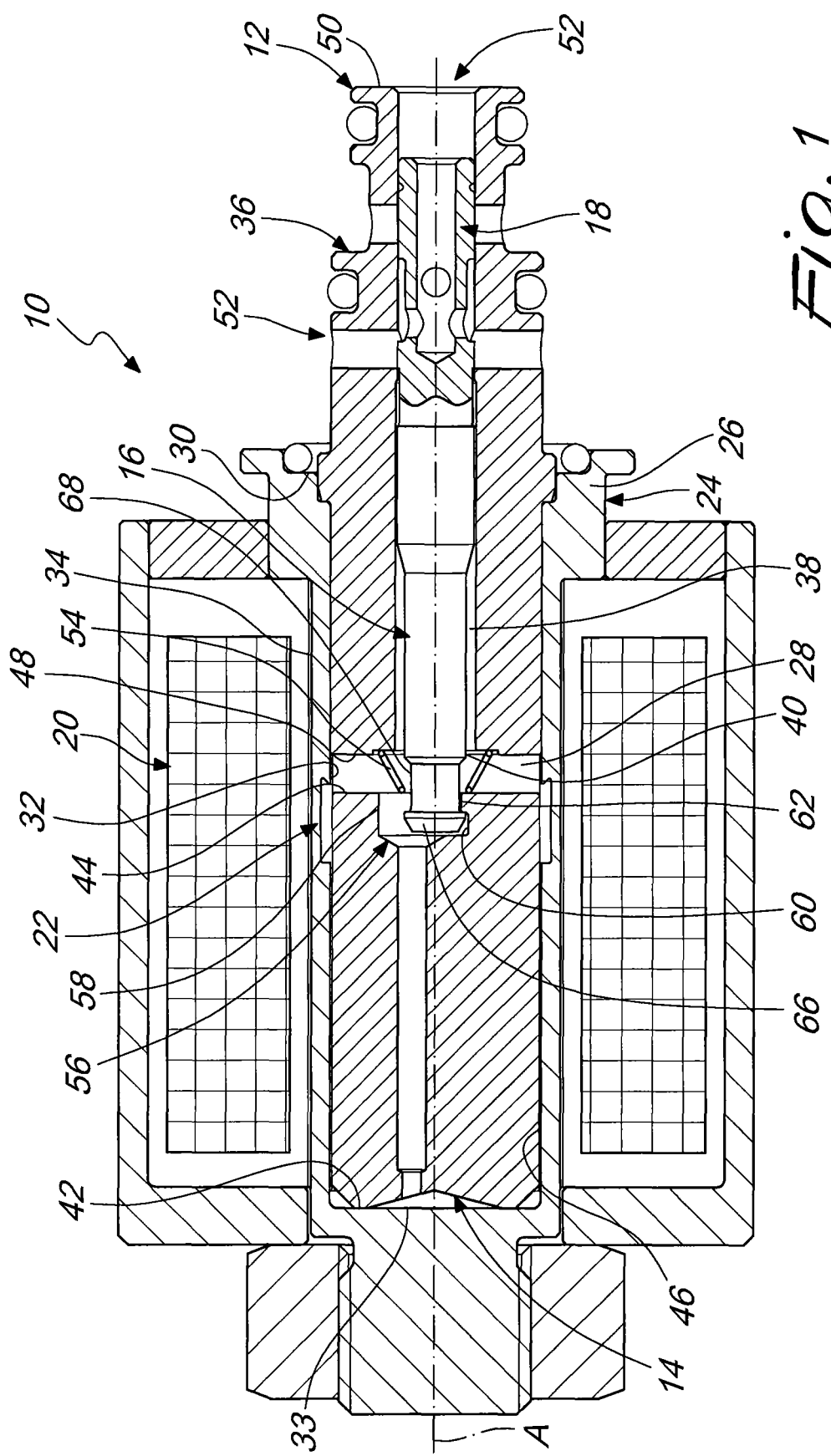
FIG. 1 is a cross-sectional view of a solenoid valve according to the present disclosure.

This disclosure generally relates to a solenoid valve for control of fluid flow. FIG. 1 illustrates a cross-section of the solenoid valve 10. Solenoid valve 10 is an electromagnetically actuated valve. The solenoid valve 10 comprises a fixed member 12, a mobile plunger 14, a rod 16 having a spool 18, an electromagnetic coil 20 and an air gap 22. FIG. 1 illustrates a non-limiting embodiment of the solenoid valve 10 in a three position, two way proportional pressure reducing valve.

Fixed member 12 comprises a tube portion 24. Tube portion 24 has a longitudinal axis A. Tube portion 24 is hollow with a lateral wall 26 surrounding bore 28. The lateral wall 26 has an internal surface 32 and an external surface 34. Tube portion 24 has an opening 30. Bore 28 is delimited by the internal surface 32 and a base surface 33. The tube portion 24 is axially elongated. In an embodiment, the tube portion 24 may be cylindrical. Tube portion 24 is made from ferromagnetic material. In an embodiment, the tube portion 24 is at least partially made from ferromagnetic material.

The solenoid valve 10 may further comprise a valve body 36. The valve body 36 is mounted to the fixed member 12. The valve body 36 is mounted to the tube portion 24. Valve body 36 is mounted to the opening 30 of the tube portion 24. Valve body 36 has a central channel 38. Channel 38 has an aperture 40. Channel 38 communicates with the bore 28 through the aperture 40. Aperture 40 is formed on a first valve body end 48. First valve body end 48 is positioned in the tube portion 24. The valve body 36 has a second valve body end 50 formed opposite the first valve body end 48. Second valve body end 50 is positioned external to the tube portion 24.

Valve body 36 has a plurality of fluid ports 52. Fluid ports 52 are positioned external to the fixed member 12. Fluid ports 52 are spaced from the opening 30. Fluid ports 52 mutually communicate through the central channel 38. Second valve body end 50 is configured to carry at least one fluid port 52. Further, fluid ports 52 may be positioned on the lateral surface of the valve body 36.

In an embodiment, valve body 36 may be inserted into the bore 28. A portion of the valve body 36 extends from the opening 30 into the bore 28. In a further embodiment, the valve body 36 may be made from ferromagnetic material. Valve body 36 may serve to attract the mobile plunger 14 when the electromagnetic coil 20 is activated.

In an alternate embodiment, valve body 36 may be positioned at the opening 30. The valve body 36 does not extend from the opening 30 into the bore 28. In yet a further embodiment, the valve body 36 may be made from ferromagnetic material.

In an embodiment, the fixed member 12 further comprises a plunger portion (not shown). Plunger portion is located at an end opposite to the opening 30. The plunger portion axially extends from the tube portion 24. Plunger portion axially extends away from the opening 30. Plunger portion and tube portion 24 may be monolithically formed. In yet a further embodiment, the plunger portion may be made from ferromagnetic material.

In an embodiment, the solenoid valve 10 may further comprise a fixed plunger (not shown). The fixed plunger is positioned in the tube portion 24. Fixed plunger is positioned in the bore 28. Fixed plunger may be fixedly positioned against the inner surface 32 of the tube portion 24. In yet a further embodiment, the fixed plunger may be made from ferromagnetic material.

The mobile plunger 14 is positioned in the fixed member 12. Mobile plunger 14 is positioned in the tube portion 24. Mobile plunger 14 is axially movable in the tube portion 24. Mobile plunger 14 is axially movable in the bore 28. Mobile plunger 14 is configured to slidably move in the tube portion 24. Mobile plunger 14 may have a first end 42, a second end 44 and a contact surface 46. Contact surface 46 is bordered by the first and second ends 42, 44 at opposite sides. Contact surface 46 is in slidable contact with the internal surface 32 of the lateral wall 26 of the tube portion 24. First end 42 may abut the base surface 33 of the bore 28. Second end 44 may face the mobile plunger 14. Second end 44 may face the first valve body 36. Second end 44 may abut the first valve body end 48 of the valve body 36.

Figure 1A:
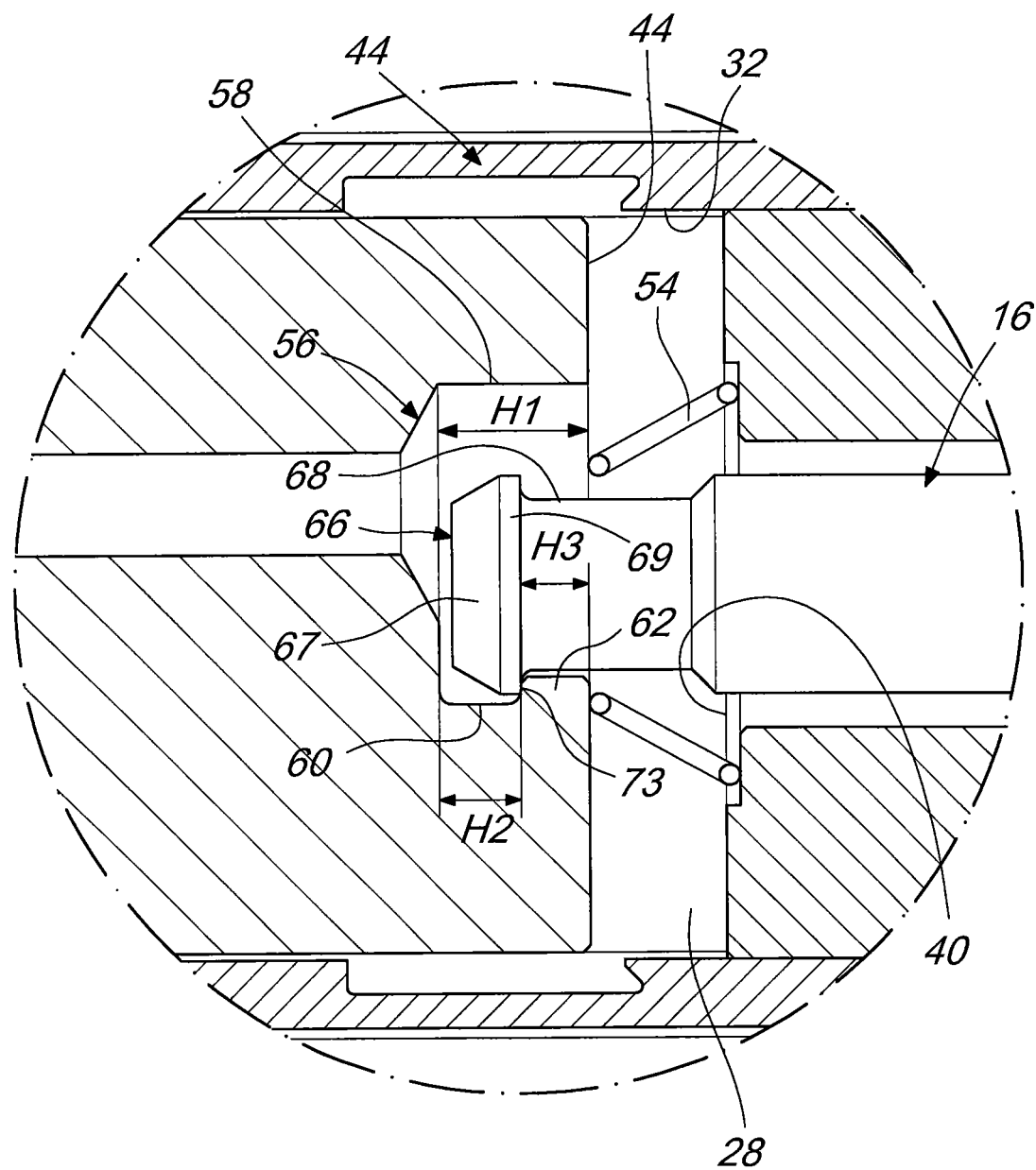
FIG. 1A is an enlarged view of a coupling in the solenoid valve of FIG. 1.
Figure 2:
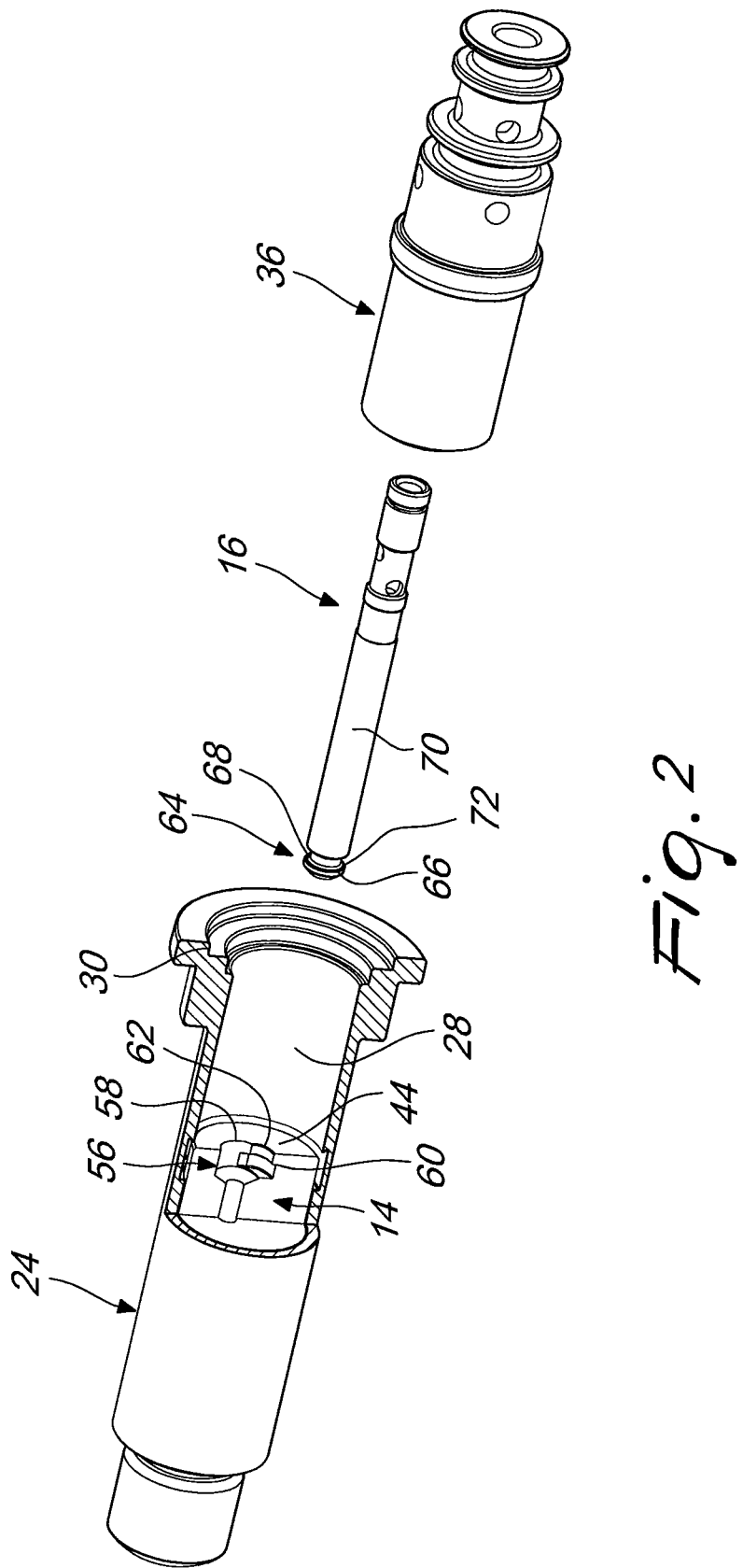
FIG. 2 is a perspective view of a solenoid valve according to the present disclosure.

With respect to FIGS. 1, 1A and 2, the mobile plunger 14 comprises a coupling element 56. The second end 44 is configured to have a coupling element 56 for coupling to rod 16. Coupling element 56 comprises a hole 58. Hole 58 may be cylindrical. Hole 58 may have a height H1. Hole 58 extends into the mobile plunger 14 from the second end 44. In an embodiment, the hole 58 has an offset position at the second end 44. Hole 58 has an offset position relative to the longitudinal axis A. The central axis of the hole 58 is parallel to the longitudinal axis A of the tube portion 24. Central axis of the hole 58 is not coincident to the longitudinal axis A of the tube portion 24.

A groove 60 is positioned at the side of the hole 58. Groove extends from the hole 58. Groove 60 may be formed as a cut-out into the side of the hole 58. The groove 60 extends radially from the central axis of the hole 58. Groove 60 extends transversely away from the longitudinal axis A. Groove 60 may have a height H2. In an embodiment, height H2 may be longer than the height of the head 66 so as to provide for axial movement of the head 66 in the groove 60. Groove 60 extends into the mobile plunger 14 from the side of the hole 58. Groove 60 partially extends along a circumferential direction about the hole 58. Groove 60 extends under the second end 44. A shoulder 62 separates the groove 60 from the second end 44. Shoulder 62 may have a height H3. The sum of the heights H2 of the shoulder 62 and the height H3 of the groove 60 is substantially equal to the height H1 of the hole 58.

The mobile plunger 14 is axially movable between a first and a second position. The mobile plunger 14 may move towards the base surface 33 to the first position. The mobile plunger 14 may move in a first direction of travel. The mobile plunger 14 may move towards the valve body 36 to the second position. The mobile plunger 14 may move in a second direction of travel. First and second positions are the extreme points of travel of the mobile plunger 14. In an embodiment, the limits of travel of the mobile plunger 14 may be determined by magnetic forces. The mobile plunger 14 may be adjacent the base surface 33 at the first position. The mobile plunger 14 may be adjacent the valve body 36 at the second position. In an alternate embodiment, the limits of travel of the mobile plunger 14 may be determined by the structures in the bore 28. In a further embodiment, mobile plunger 14 may abut the base surface 33 at a first end of travel that defines the first position. Mobile plunger 14 may abut the valve body 36 at a second end of travel that defines the second position. In an alternate further embodiment, mobile plunger 14 may abut a fixed plunger at a second end of travel that defines the second position.

The solenoid valve 10 further comprises an elastic member 54. Elastic member 54 is provided to return the mobile plunger 14 from an electromagnetically actuated position. In an embodiment, the elastic member 54 may be compressed when the mobile plunger 14 is at an electromagnetically actuated position. In an embodiment, the elastic member 54 may be extended when the mobile plunger 14 is at an electromagnetically actuated position. The elastic member 54 may be positioned between the mobile plunger 14 and the valve body 36.

With reference to FIG. 1, the rod 16 is coupled to the mobile plunger 14. Rod 16 is axially elongated. The rod 16 is axially movable in the tube portion 24. Rod 16 is supported by the mobile plunger 14 in the bore 28. Rod 16 extends into the channel 38 of the valve body 36 through aperture 40. Rod 16 is axially movable in the channel 38. Rod 16 axially extends along the longitudinal axis A of the tube portion 24.

Rod 16 has a coupling end 64. The coupling end 64 hookingly couples to the coupling element 56 of the mobile plunger 14. Coupling end 64 comprises a head 66 and a collar 68. Head 66 is positioned at the terminal point of the rod 66. In an embodiment, head 66 has a frustoconical shape. Head has a first portion 67 that is frustoconical and a second portion 69 that is cylindrical. The first portion 67 is contiguous to the second portion 69.

The head 66 is connected to a stem 70 though the collar 68. Collar 68 has a reduced diameter with respect to the head 66 and the stem 70. Collar 68 has a reduced diameter with respect to the stem 70. The second portion of the head 66 may have the same diameter to the stem 70. Head 66 has a ledge 72 extending over the collar 68. Coupling end 64 hookingly couples to the coupling element 56 of the mobile plunger 14 through the interaction of the ledge 72 and the shoulder 62. Ledge 72 hookingly engages the shoulder 62.

With reference to FIGS. 1A and 2, the head 66 fits into the hole 58. Head 66 slots into the groove 60. The head 66 remains in the groove 60 as transverse movement of the head 66 is not possible. At assembly of the solenoid valve 10, rod 16 is assembled in the valve body 36 which is in turn positioned in the in the tube 24 thereby permitting only axial movement of the rod 16. Ledge 72 hookingly engages the shoulder 62 when the head 66 slots into the groove 60. The ledge 72 abuts the internal surface 73 of the shoulder 62. The ledge 72 may rest on the side of the groove 60. In an embodiment, the collar 68 may rest against the shoulder 62. Rod 16 moves correspondingly with the mobile plunger 14 between the first and second position. The rod 16 may move along the first or the second directions of travel with the mobile plunger 14.

Figure 1B:
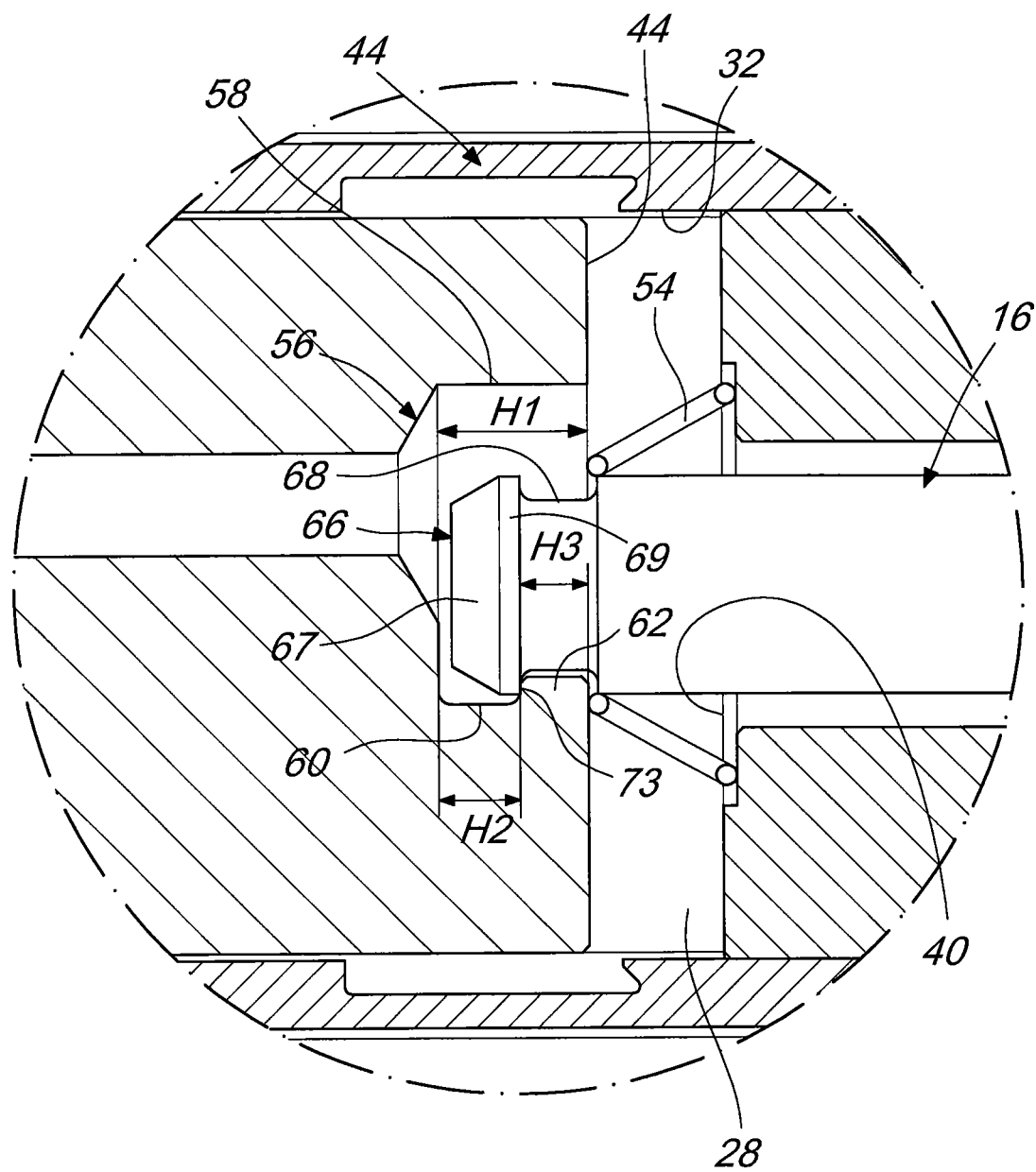
FIG. 1B is an enlarged view of a coupling, in an alternative embodiment, in the solenoid valve of FIG. 1.

With reference to FIG. 1B, in an alternative embodiment, the collar 68 is configured such that the shoulder 62 engages the head 66 and the stem 70. The collar 68 rests on the shoulder 62. The shoulder 62 may be held between the head 66 and the stem 70. The circumferential contact surface between the collar 68 and the shoulder 62 may extend to about 208 degrees.

With reference to FIGS. 1 and 2, the spool 18 is positioned at an opposite end of the rod 16 relative to the coupling end 64. In an embodiment, spool 18 is integrated into the rod 16.

In an alternate embodiment, spool 18 is coupled to the rod 16. The spool 18 spool extends into the valve body 36. Spool 18 controls fluid flow through the fluid ports 52 in the valve body 36. Spool 18 moves correspondingly with the mobile plunger 14. The spool 18 is positionable to control fluid flow through the valve body 36 as the mobile plunger 14 moves between the first and second position. Spool 18 comprises fluid ports 86 and a conduit 88 for flow of fluid.

The electromagnetic coil 20 is positioned externally to the fixed member 12. Electromagnetic coil 20 is positioned relative to the mobile plunger 14 so as to effect actuation thereof upon activation. In an embodiment, electromagnetic coil 20 is positioned in axial correspondence to the valve body 36 so as to effect actuation the mobile plunger 14 at activation. Electromagnetic coil 20 is positioned to axially correspond to the valve body 36. Electromagnetic coil 20 is positioned to partially overlap the valve body 36. Electromagnetic coil 20 is positioned to axially correspond to the mobile plunger 14. Electromagnetic coil 20 is positioned to partially overlap the mobile plunger 14. Electromagnetic coil 20 is positioned to axially correspond to the mobile plunger 14 at the second end 44. Electromagnetic coil 20 is positioned to partially overlap the second end 44 of the mobile plunger 14. Electromagnetic coil 20 is positioned to axially correspond to an air gap 22. Electromagnetic coil 20 is positioned to overlap the air gap 22.

The air gap 22 is positioned in tube portion 24. The air gap 22, in the tube portion 22, is positioned between the electromagnetic coil 20 and the mobile plunger 14. The air gap 22 is axially located along the tube portion 24 so as to be positioned between the electromagnetic coil 20 and the mobile plunger 14. The air gap 22 is positioned between the electromagnetic coil 20 and the mobile plunger 14 in the radial direction relative to a longitudinal axis A of the tube portion 24. In an embodiment, the air gap 22 is positioned remote from the base surface 33 of the bore 28. The air gap 22 is spaced from the valve body 36. The air gap 22 may be positioned about the coupling of the coupling element 56 and the coupling end 64. The air gap 22 encircles the coupling end 64 hookingly coupled to the coupling element 56. The air gap 22 encircles the head 66 slotted into the groove 60.

In an alternative embodiment, the solenoid valve 10 may have a first and a second electromagnetic coils 20. The second magnetic coil 20 may be positioned adjacent to the first electromagnetic coil 20.

A method of assembling the solenoid valve 10 may comprise the steps of providing the fixed member 12 having the tube portion 24; coupling the rod 16 to a mobile plunger 14, the rod 16 having the spool 18 for control of fluid flow; inserting the mobile plunger 14 in the tube portion 24, the mobile plunger 14 being axially movable between a first and a second position and the rod 16 being axially movable in the tube portion 24; and positioning the electromagnetic coil 20 externally to the fixed member 16, and hookingly coupling the coupling end 64 of the rod 16 to a coupling element 56 of the tube portion 24.

The coupling end 64 comprises the head 66 and the coupling element 56 has a hole 58. The method comprises inserting the head 66 into the hole 58 along an axial direction. The head 66 is inserted in a direction along the longitudinal axis A.

The coupling element 56 further comprises the groove 60 extending from a side of the hole 58. The method comprises slotting the head 66 into the groove 60 along a transverse direction. The head 66 is slotted in a direction transverse to the longitudinal axis A. The valve body 36 is mounted to the rod 16 prior to the coupling of the rod 16 to the mobile plunger 14.

The skilled person would appreciate that foregoing embodiments may be modified or combined to obtain the solenoid valve 10 of the present disclosure.

Figure 3:
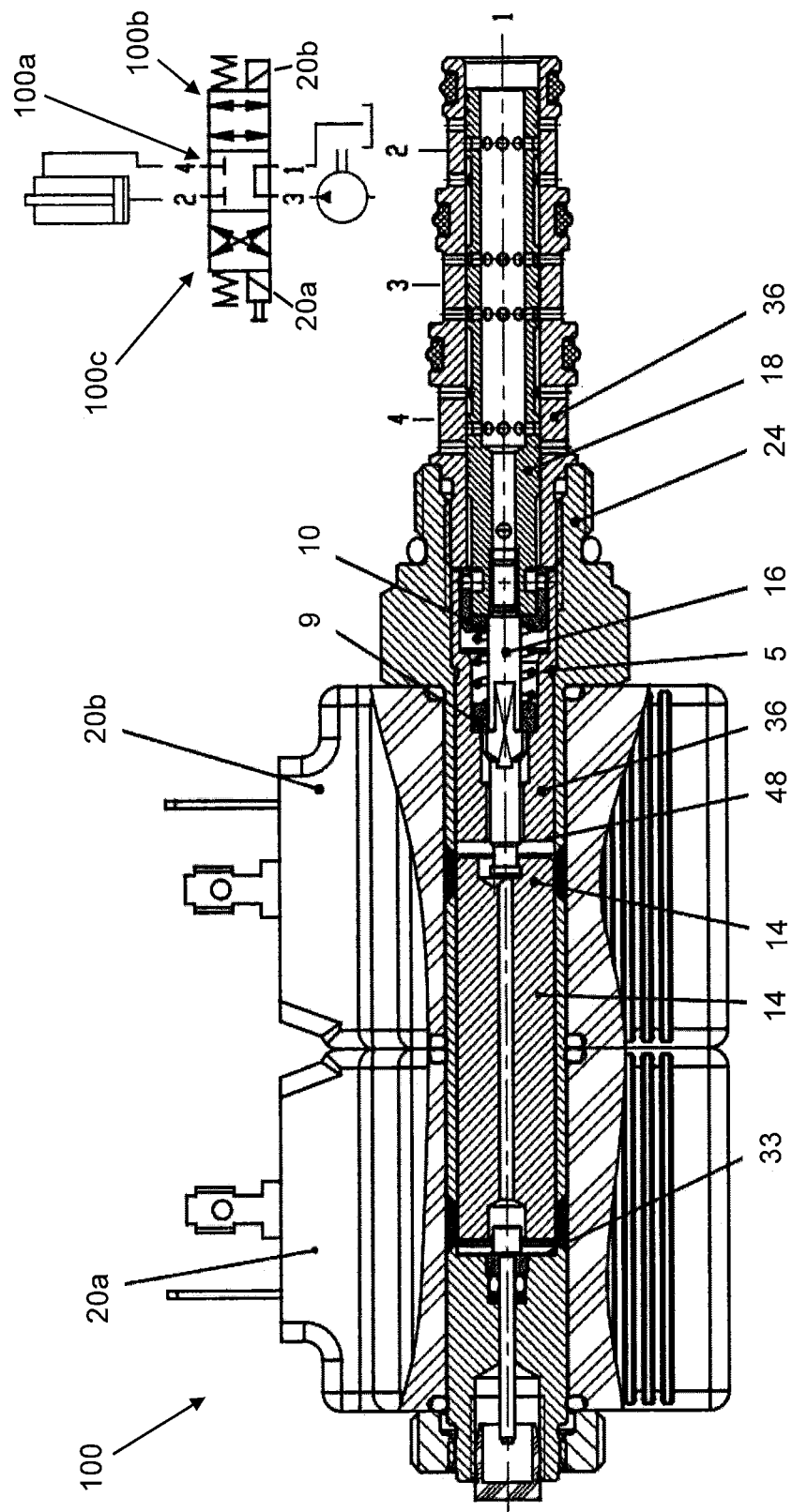
FIG. 3 is a cross-sectional view of a further embodiment of a solenoid valve according to the present disclosure.

FIG. 3 illustrates a cross-section of a solenoid valve 100 which is a variant of the solenoid valve 10 depicted in FIG. 1. In the following, only the differences between the solenoid valve 100 of FIG. 3 and the solenoid valve 10 of FIG. 1 are explained in detail, wherein recurring features are designated with the same reference signs.

The solenoid valve 100 of FIG. 3 differs from the solenoid valve 10 of FIG. 1 in that the solenoid valve 100 of FIG. 3 comprises two electromagnetic coils, namely a first coil 20*a* and a second coil 20*b*. The two coils 20*a*, 20*b* can be activated and deactivated independently of one another. A first end portion of the mobile plunger 14 is disposed within the first coil 20*a*, and a second end portion of the mobile plunger 14 opposite the first end portion of the mobile plunger 14 is disposed within the second coil 20*b*.

The solenoid valve 100 of FIG. 3 further differs from the solenoid valve 10 of FIG. 1 in that the solenoid valve 100 of FIG. 3 comprises a spring 5 which forces the spool 18 to a defined center position 100*a* relative to the fixed valve body 36 when neither of the coils 20*a*, 20*b* are activated. The center position 100*a* of the spool 18 is depicted in the schematic at the top right of FIG. 3. Specifically, a first end of the spring 5 is supported by a first washer 9. The first washer 9 is configured to interact with a first portion of the rod 16 such as with a shoulder of the rod 16. The first washer 9 is further configured to interact with a first portion of the fixed valve body 36 such as with a first shoulder of the valve body 36. A second end of the spring 5 opposite the first end of the spring 5 is supported by a second washer 10. The second washer 10 is configured to interact with a second portion of the rod 16 such as with a portion of the spool 18. The second washer 10 is further configured to interact with a second portion of the fixed valve body 36 such as with a second shoulder of the valve body 36.

When the electromagnetic coils 20*a*, 20*b* are not activated, the spring 5 and the washers 9, 10 interact with the rod 16 and with the fixed valve body 36 to force the mobile plunger 14 and the spool 18 to their center position with respect to the fixed valve body 36. When the spool 18 is in its center position 100*a*, the spool 18 provides fluid communication between the side port 3 and the front port 1 of the fixed valve body 36 while fluidly isolating the side ports 2 and 4 of the valve body 36 from the ports 1 and 3 and from one another.

When only the first coil 20*a* is activated, the first coil 20*a* forces the mobile plunger 14 toward the left in FIG. 3 and toward the base surface 33 of the tube portion 24. Due to the coupling between the mobile plunger 14 and the rod 16 as depicted in FIGS. 1A and 1B above, the mobile plunger 14 drags the rod 16 and the spool 18 toward the left, thereby forcing the spool 18 to its second position 100*b*. When the spool 18 is in its second position 100*b*, the spool 18 provides fluid communication between the ports 1 and 4 and between the ports 2 and 3, respectively. When the first coil 20*a* is deactivated, the spring 5 again forces the spool 18 to its center position 100*a*.

When only the second coil 20*b* is activated, the second coil 20*b* forces the mobile plunger 14 toward the right in FIG. 3 and toward the end 48 of the fixed valve body 36. Due to the coupling between the mobile plunger 14 and the rod 16, the mobile plunger 14 pushes the rod 16 and the spool 18 toward the right, thereby forcing the spool 18 to its third position 100c. When the spool 18 is in its third position 100c, the spool 18 provides fluid communication between the ports 1 and 2 and between the ports 3 and 4, respectively. When the second coil 20b is deactivated, the spring 5 again forces the spool 18 to its center position 100a.

INDUSTRIAL APPLICABILITY

This disclosure describes a solenoid valve 10 and a solenoid valve 100 having a hooking type coupling system that couples the rod 16 to the tube portion 24. The hooking type coupling has the advantage of increasing the speed of assembly and of recovering the radial clearance, without increasing the axial clearance which affect the movement of the mobile plunger. The hooking type coupling between the coupling element 56 wherein the coupling end 64 results in less ferromagnetic material being removed from the mobile plunger 14. Removal of excess ferromagnetic material negatively reduces the electromagnetic forces. Removal of less ferromagnetic material in the magnetic field closing zone allows the maximum efficiency of the magnetic force to be maintained. The solenoid valves 10, 100 that have the mobile plunger 14 connected to the spool 18 ensure greater stability in dynamic operation as the said components always move together and without any delay being imparted from one component to another.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

Where technical features mentioned in any claim are followed by reference signs, the reference signs have been included for the sole purpose of increasing the intelligibility of the claims and accordingly, neither the reference signs nor their absence have any limiting effect on the technical features as described above or on the scope of any claim elements.

One skilled in the art will realize the disclosure may be embodied in other specific forms without departing from the disclosure or essential characteristics thereof. The foregoing embodiments are therefore to be considered in all respects illustrative rather than limiting of the disclosure described herein. Scope of the invention is thus indicated by the appended claims, rather than the foregoing description, and all changes that come within the meaning and range of equivalence of the claims are therefore intended to be embraced therein.

The invention claimed is:

1. A method of assembling a solenoid valve comprising the steps of:
providing a solenoid valve comprising a fixed member having a tube portion, a mobile plunger positioned within the tube portion of the fixed member, a rod coupled to the mobile plunger and having a spool to control an amount of fluid flow, an electromagnetic coil positioned externally relative to the fixed member, and an air gap formed about a coupling end of the rod and within the tube portion of the fixed member between the electromagnetic coil and the mobile plunger, wherein the mobile plunger has a coupling element, wherein the coupling element of the mobile plunger comprises a shoulder, wherein the coupling end of the rod comprises a ledge, wherein the coupling element is positioned at an end of the mobile plunger and comprises a hole and a groove extending from the hole, and wherein the coupling end comprises a head and a collar;
coupling hookingly the coupling end of the rod to the coupling element of the mobile plunger, wherein the ledge of the coupling end of the rod hookingly engages the shoulder of the coupling element, and wherein the head of the coupling end engages into the groove of the coupling element; and
inserting the mobile plunger within the tube portion of the fixed member, wherein the mobile plunger is axially movable between a first and a second position, and wherein the rod is axially movable within the tube portion of the fixed member.

2. The method of claim 1, further comprising the step of:
inserting the head of the rod into the hole of the mobile plunger along an axial direction.

3. The method of claim 1, further comprising the step of:
slotting the head of the rod into the groove in the coupling element of the mobile plunger along a transverse direction.

4. The method of claim 3, wherein the air gap encircles the head of the rod that slotted into the groove within the coupling element of the mobile plunger.

5. A solenoid valve, comprising:
a fixed member having a tube portion;
a mobile plunger positioned in the tube portion, the mobile plunger being axially movable between a first and a second position;
a rod coupled to the mobile plunger and having a spool for control of fluid flow, the rod being axially movable in the tube portion, wherein the rod has a coupling end and the mobile plunger has a coupling element, wherein the coupling element comprises a shoulder, wherein the coupling end of the rod comprises a ledge, wherein the ledge hookingly engages the shoulder of the coupling element, wherein the coupling element is positioned at an end of the mobile plunger and comprises a hole and a groove extending from the hole, wherein the coupling end comprises a head and a collar, and wherein the head engages into the groove of the coupling element;
an electromagnetic coil positioned externally relative to the fixed member and
an air gap; formed within the tube portion between the electromagnetic coil and the mobile plunger, and wherein the air gap is formed about the coupling end that is hookingly coupled to the coupling element.

6. The solenoid valve of claim 5, wherein the air gap encircles the head slotted into the groove.

* * * * *